(12) United States Patent
Kumar

(10) Patent No.: US 11,937,329 B2
(45) Date of Patent: Mar. 19, 2024

(54) DISCONTINUOUS RECEPTION (DRX) IN MULTI-SUBSCRIBER IDENTITY MODULE DEVICES

(71) Applicant: QUALCOMM Incorporated, San Diego, CA (US)

(72) Inventor: Akash Kumar, Hyderabad (IN)

(73) Assignee: QUALCOMM Incorporated, San Diego, CA (US)

(*) Notice: Subject to any disclaimer, the term of this patent is extended or adjusted under 35 U.S.C. 154(b) by 153 days.

(21) Appl. No.: 17/378,287

(22) Filed: Jul. 16, 2021

(65) Prior Publication Data

US 2023/0014227 A1 Jan. 19, 2023

(51) Int. Cl.
*H04W 76/28* (2018.01)
*H04W 88/06* (2009.01)

(52) U.S. Cl.
CPC .......... *H04W 76/28* (2018.02); *H04W 88/06* (2013.01)

(58) Field of Classification Search
CPC ...... H04W 76/28; H04W 88/06; H04W 8/183

USPC ........................................................ 370/328
See application file for complete search history.

(56) References Cited

U.S. PATENT DOCUMENTS

| 2012/0135715 A1* | 5/2012 | Kang | H04W 4/16 455/418 |
| 2022/0201566 A1* | 6/2022 | Shrivastava | H04L 1/0038 |
| 2023/0007624 A1* | 1/2023 | Murray | H04W 68/005 |

FOREIGN PATENT DOCUMENTS

WO WO-2021113581 A1 * 6/2021 ............ H04W 68/00

* cited by examiner

*Primary Examiner* — Inder P Mehra
(74) *Attorney, Agent, or Firm* — QUALCOMM Incorporated

(57) ABSTRACT

A method of wireless communication performed by a user equipment (UE), the method including: determining to operate in a Dual SIM Dual Active (DSDA) mode or a Dual SIM Dual Standby (DSDS) mode, the UE having a first subscriber identity module (SIM) and a second SIM; and selecting a discontinuous reception (DRX) parameter value based at least in part on the DSDA mode or the DSDS mode.

21 Claims, 12 Drawing Sheets

DISCONTINUOUS RECEPTION (DRX) IN MULTI-SUBSCRIBER IDENTITY MODULE DEVICES

TECHNICAL FIELD

This application relates to wireless communication systems, and more particularly to Discontinuous Reception (DRX) settings in multi-subscriber identity module (Multi-Sim) devices.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Furthermore, as wireless communication becomes cheaper and more reliable, expectations among consumers change. Some UE manufacturers are responding to consumer preferences by including multiple subscriber identity modules (SIMs) within UEs.

However, including multiple SIMs within a device may lead to excessive power usage or resource conflict in some scenarios. As use cases and diverse deployment scenarios continue to expand in wireless communication, techniques to allow users to exploit multiple SIMs may also yield benefits.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication, performed by a user equipment (UE), includes: determining to operate in a Dual SIM Dual Active (DSDA) mode or a Dual SIM Dual Standby (DSDS) mode, the UE having a first subscriber identity module (SIM) and a second SIM; and selecting a discontinuous reception (DRX) parameter value based at least in part on the DSDA mode or the DSDS mode.

In an additional aspect of the disclosure, a user equipment (UE) includes a first SIM associated with a first service provider subscription and a second SIM associated with a second service provider subscription; and a processor configured to access the first SIM and the second SIM, the processor further configured to: determine to operate in a DSDA mode in which both the first SIM and the second SIM are available for handling calls simultaneously; and setting a DRX parameter value to maximize overlap between a first DRX On duration of the first SIM and a second DRX On duration of the second SIM.

In an additional aspect of the disclosure, a non-transitory computer-readable medium having program code recorded thereon for wireless communication by a UE, the program code includes: code for operating in a DSDS mode in which either one but not both of a first SIM and a second SIM are available for a connected mode at a given time; and code for setting a DRX parameter value to minimize overlap between a first DRX On duration and a second DRX On duration in response to operating in the DSDS mode.

In an additional aspect of the disclosure, a UE includes a first SIM and a second SIM; means for selecting a DSDA mode or a DSDS mode based at least in part on available radio frequency (RF) resources for a frequency band combination available to the first SIM and the second SIM; and means for setting a DRX On duration overlap for the first SIM and the second SIM based at least in part on the DSDA mode or the DSDS mode.

Other aspects, features, and embodiments will become apparent to those of ordinary skill in the art, upon reviewing the following description of specific, exemplary aspects in conjunction with the accompanying figures. While features may be discussed relative to certain aspects and figures below, all aspects can include one or more of the advantageous features discussed herein. In other words, while one or more aspects may be discussed as having certain advantageous features, one or more of such features may also be used in accordance with the various aspects discussed herein. In similar fashion, while exemplary aspects may be discussed below as device, system, or method aspects it should be understood that such exemplary aspects can be implemented in various devices, systems, and methods.

DETAILED DESCRIPTION

Figure 1:
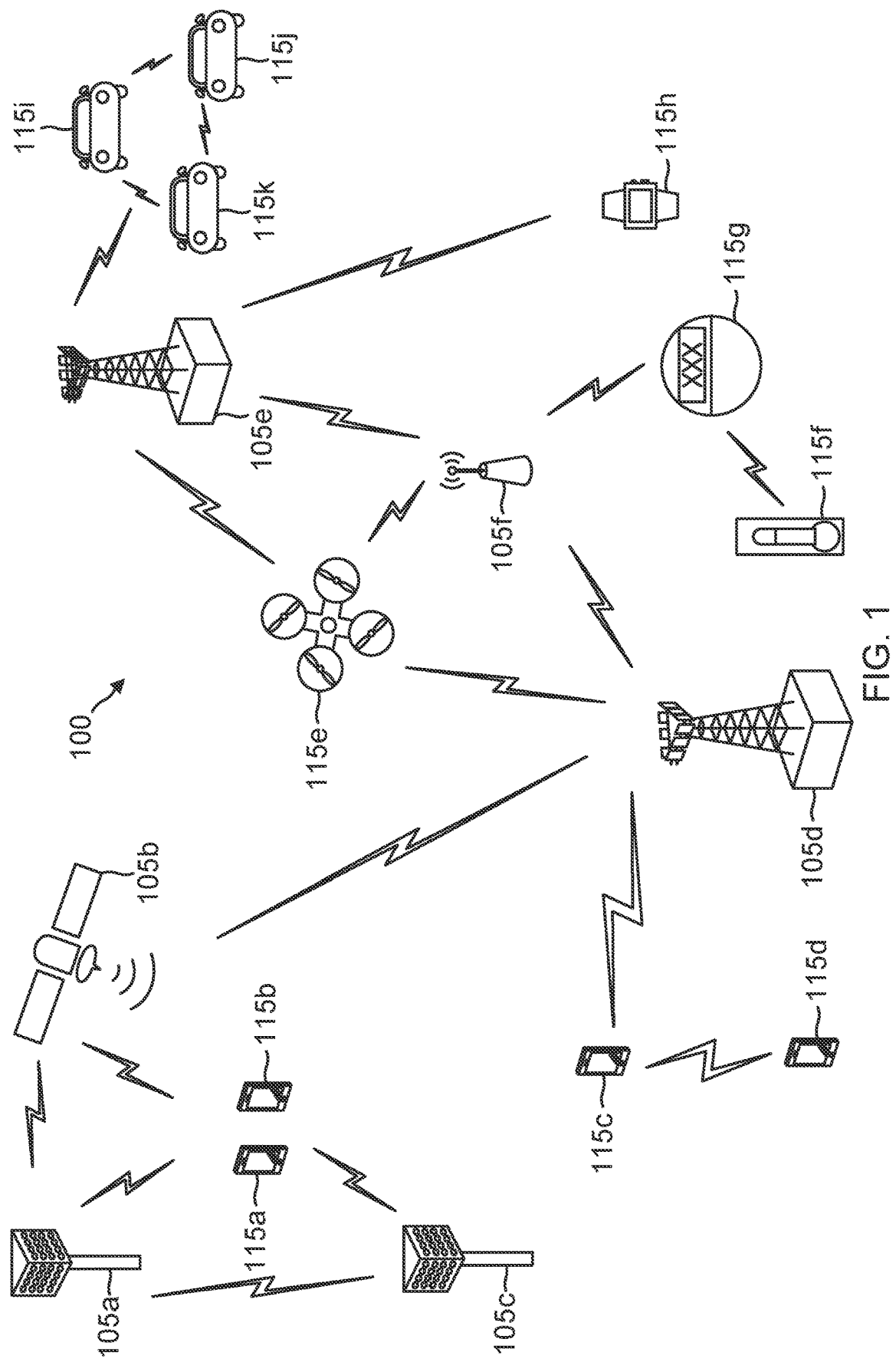
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some aspects, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1 M nodes/km$^2$), ultra-low complexity (e.g., ~10 s of bits/sec), ultra-low energy (e.g., ~10+years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~ 10 Tbps/km$^2$), extreme data rates (e.g., multi-Gbps rate, 100+ Mbps user experienced rates), and deep awareness with advanced discovery and optimizations.

A 5G NR system may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW. In certain aspects, frequency bands for 5G NR are separated into two different frequency ranges, a frequency range one (FR1) and a frequency range two (FR2). FR1 bands include frequency bands at 7 GHz or lower (e.g., between about 410 MHz to about 7125 MHz). FR2 bands include frequency bands in mmWave ranges between about 24.25 GHz and about 52.6 GHz. The mmWave bands may have a shorter range, but a higher bandwidth than the FR1 bands. Additionally, 5G NR may support different sets of subcarrier spacing for different frequency ranges.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

In certain aspects, a wireless communication device or UE is a multiple SIM (MultiSim) device capable of utilizing multiple subscriptions for communication with one or more networks. For instance, the UE may include two SIMs, a first SIM for a first subscription and a second SIM for a second subscription. In some instances, the first and second subscriptions may be provided by the same operator. For example, the first subscription and the second subscription may correspond to different user accounts and/or services on the same operator network. In other instances, the first and second subscriptions may be provided by different operators. In any case, in certain scenarios, the UE may communicate using the first subscription and/or the second subscription. In some instances, the UE may operate in a dual-SIM dual-standby (DSDS) mode, where both subscriptions can be on standby (in an idle mode) waiting to begin communications. However, when a communication or network connection is established on one SIM (e.g., the first subscription), the other SIM (e.g., the second subscription) is no longer active. That is, one SIM may be active at a given time. The DSDS mode may be suitable for UEs that are equipped with a single transceiver and/or radio frequency (RF) chain which can either be utilized by the first subscription or the second subscription. In other instances, the UE may operate in a dual-SIM dual-active (DSDA) mode, where the UE may simultaneously connect to the same network or different networks via the first SIM and the second SIM. To operate in the DSDA mode, the UE may have separate transceiver and/or RF chains or resources for the first SIM and the second SIM. In the present disclosure, an operation or communication performed via a SIM may refer to an operation or communication performed for a wireless service subscription associated with the SIM (where the subscription information for the wireless service is stored).

As a UE moves around, it may encounter various cells operating in different ways. For instance, some 5G cells may use an existing cell with another technology (e.g., LTE) for control signaling. When operating in a 5G mode, it is said that the cell is operating in a non-standalone (NSA) mode. By contrast, other 5G cells may perform both signaling and connected mode using 5G protocols. Those cells operate in a standalone (SA) mode. In some implementations, a UE may operate in a DSDA mode when both of its SIMs are camping on cells operating in SA mode. In one example, a first SIM (SIM 1) is camped on a cell in FR1 SA mode, and a second SIM (SIM 2) is camped on a cell in FR2 SA mode, and the UE may operate in DSDA mode. In another example, SIM 1 is camped on a cell in FR1 SA mode, and SIM 2 is camped on another cell in FR1 SA mode but in a frequency range that can be independently tuned relative to the frequency band used by SIM 1. In this example, the UE may operate in DSDA mode. However, in other instances in which the SIMs cannot independently tune the UE may operate in DSDS mode. Thus, the UE may in some instances operate in DSDA mode and in other instances may operate in DSDS mode, and the mode may depend on available cells and the characteristics of those cells.

Since the DSDA/DSDS mode may change from time to time, various implementations provide techniques to dynamically select discontinuous reception (DRX) parameter values based at least in part on the DSDA or DSDS mode in which the UE operates at a given time. DRX is a functionality included in some 5G UEs. With a DRX cycle configured, the UE may monitor the downlink control signaling when it is in an On duration of its cycle and may sleep with the receiver circuitry switched off during its Off duration of its cycle. DRX was introduced to save power.

When DRX is combined with a dynamic DSDA/DSDS functionality, various issues may arise. In one scenario, a UE may be in a connected mode with DRX configured on both subscriptions and the UE operating in DSDA mode. Since the DRX cycle on the two subscriptions may be staggered, various hardware in the device (e.g., modem, processor, and other common hardware blocks) may need to be awake for the whole duration of the On duration of the two subscriptions. When the On durations of the two subscriptions are staggered, that may increase power consumption.

In another scenario, the UE operates in a DSDS mode, and there may be instances in which the network may not release the radio resource control (RRC) connection after a data session. This may allow both subscriptions to get stuck in an RRC connected mode with overlapping On durations of their respective DRX configurations. In other words, the two subscriptions may share resources when operating in DSDS mode, and this can lead to a resource conflict, which may further lead to call misses and a higher ping latency.

The inventors propose to select a DRX parameter value based at least in part on a DSDA mode or DSDS mode of the UE. Specifically, for a DSDA mode, the UE may seek to maximize overlap in the On duration of the DRX cycle of two subscriptions. Maximum overlap may allow for the overall device wake-up duration to be minimized. Maximum overlap may help ensure the current consumption due to common radio frequency (RF) activities are reduced. For a DSDS mode, the UE may seek to minimize overlap in the On duration of the DRX cycles of the two subscriptions. This may help ensure that the UE is able to operate on the two subscriptions with little or no resource conflict. In one example, the UE checks the operating band on the two subscriptions to determine the operating mode (DSDA or DSDS) based on available RF resources for that band combination. The UE may then try to maximize or minimize overlap based on either the DSDA mode or DSDS mode.

In one example, the UE may request to change a DRX configuration parameter to achieve the desired On duration overlap of the two subscriptions. An example of requesting to change the DRX configuration parameter may include the UE sending a UE Assistance Information (UIA) message to the base station, where the message may indicate a desired cycle duration and/or a desired start offset for either one or both of the subscriptions.

In another example, a UE may proactively reselect to a cell on one or both of the subscriptions to achieve a maximum or minimum overlap based on the DSDA or DSDS mode. For instance, for an idle mode subscription, the UE may prioritize reselection to a cell that meets a desired DRX criterion either by using a start offset as a selection criterion or by selecting a suitable cell when multiple cells satisfy the selection criteria. In a connected mode, the UE may use an event report mechanism or a conditional handover configuration to select a cell that has a desired DRX configuration.

In some examples, different bandwidth parts (BWPs) may be configured with different respective DRX configurations. The UE may then compare the DRX configurations of the different bandwidth parts and then indicate a preferred bandwidth part that conforms to a desired DRX configuration. In some examples, a UE may select a desired PS_offset for a wake-up signal to align or stagger the wake-up signals on the two subscriptions dependent on the DSDA or DSDS mode.

Aspects of the present disclosure can provide several benefits. For example, when the UE operates in DSDA mode, maximizing overlap of the On durations of the DRX cycles of the subscriptions may save power. Specifically, maximizing overlap of the On durations may reduce or eliminate any amounts of time in which one subscription but not the other is in an On duration. Thus the On durations are aligned, thereby maximizing the total sleep time for shared hardware resources. Various simulations have shown a power use reduction between 1% and 7% in such instances, though the scope of implementations is not limited to any value for power use reduction. Furthermore, when the UE operates in DSDS mode, minimizing overlap of the On durations may provide a performance benefit. Specifically, preventing resource conflict may help ensure that the UE does not miss signaling messages from the network. Examples of signals that might otherwise be missed include page messages for an incoming call for any kind of RRC-level signaling. Thus, minimizing the overlap may help improve mobile terminating and voice call performance.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 (individually labeled as 115a, 115b, 115c, 115d, 115e, 115f, 115g, 115h, and 115k) and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support communications with ultra-reliable and redundant links for devices, such as the UE 115e, which may be airborne. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-action-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some aspects, the subcarrier spacing between adjacent subcarriers may be fixed, and the total number of subcarriers (K) may be dependent on the system BW. The system BW may also be partitioned into subbands. In other aspects, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some aspects, the BSs 105 may broadcast the PSS, the SSS, and/or the MIB in the form of synchronization signal block (SSBs) and may broadcast the RMSI and/or the OSI over a physical downlink shared channel (PDSCH). The MIB may be transmitted over a physical broadcast channel (PBCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response.

The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant. The connection may be referred to as an RRC connection. When the UE 115 is actively exchanging data with the BS 105, the UE 115 is in an RRC connected state.

In an example, after establishing a connection with the BS 105, the UE 115 may initiate an initial network attachment procedure with the network 100. The BS 105 may coordinate with various network entities or fifth generation core (5GC) entities, such as an access and mobility function (AMF), a serving gateway (SGW), and/or a packet data network gateway (PGW), to complete the network attachment procedure. For example, the BS 105 may coordinate with the network entities in the 5GC to identify the UE, authenticate the UE, and/or authorize the UE for sending and/or receiving data in the network 100. In addition, the AMF may assign the UE with a group of tracking areas (TAs). Once the network attach procedure succeeds, a context is established for the UE 115 in the AMF. After a successful attach to the network, the UE 115 can move around the current TA. For tracking area update (TAU), the BS 105 may request the UE 115 to update the network 100 with the UE 115's location periodically. Alternatively, the UE 115 may only report the UE 115's location to the network 100 when entering a new TA. The TAU allows the network 100 to quickly locate the UE 115 and page the UE 115 upon receiving an incoming data packet or call for the UE 115.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, a UE 115 may be capable of utilizing multiple subscriber identity modules and may operate in both a DSDA and DSDS mode and may select DRX parameter values based on the DSDA or DSDS mode, as explained in more detail below.

Figure 2:
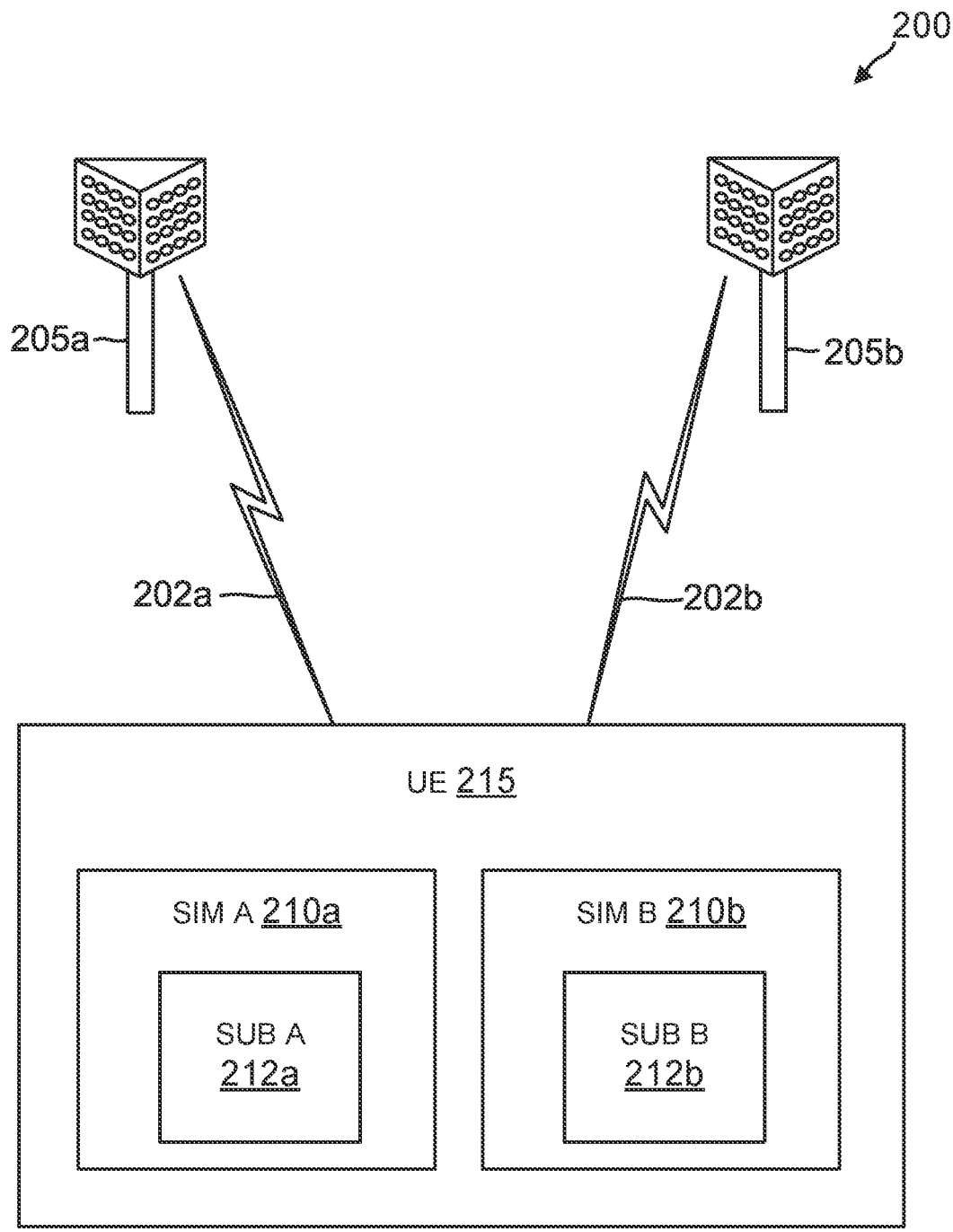
FIG. 2 illustrates a communication scenario utilizing multiple subscriptions according to some aspects of the present disclosure.

FIG. 2 illustrates a communication scenario 200 that utilizes multiple subscriptions according to some aspects of the present disclosure. The communication scenario 200 may correspond to a communication scenario among BSs 105 and or UEs 115 in the network 100. For simplicity, FIG. 2 illustrates two BSs 205 (shown as 205a and 205b) and one UE 215, but a greater number of UEs 215 (e.g., the about 3, 4, 3, 6, 7, 8, 9, 10, or more) and/or BSs 205 (e.g., the about 3, 4 or more) may be supported. The BS 205 and the UEs 215 may be similar to the BSs 105 and the UEs 115, respectively.

In the scenario 200, the UE 215 is capable of utilizing multiple SIMs (e.g., SIM cards) for communication with one or more networks. For simplicity, FIG. 2 illustrates the UE 215 including two SIMs 210 (shown as SIM A 210a and SIM B 210b), but the UE 215 may include more than two SIMs (e.g., about 3, 4 or more). In some aspects, each SIM 210 may include integrated circuits and/or memory configured to store information used for accessing a network, for example, to authenticate and identify the UE 215 as a subscriber of the network. Some examples of information stored at the SIM A 210a and/or SIM B 210b may include, but not limited to, a subscriber identity such as an international mobile subscriber identity (IMSI) and/or information and/or key used to identify and authenticate the UE 215 in a certain provider network. As an example, the UE 215 may subscribe to a first operator and a second operator. That is, the UE 215 may have a first subscription 212a (shown as SUB A) with the first operator and a second subscription 212b (shown as SUB B) with the second operator. Accordingly, the SIM A 210a may store or maintain information for accessing a network of the first operator based on the first subscription 212a, and the SIM B 210b may store information for access a network of the second operator based on the second subscription 212b. In some instances, the first operator and the second operator may correspond to the same operator. For example, the first subscription 212a and the second subscription 212b may correspond to different user accounts and/or services subscribed with the same operator. In other instances, the first operator may be different from the second operator.

In operation, the UE 215 may communicate with a BS 205a (operated by the first operator) using the SIM A 210a via a radio link 202a. Further, the UE 215 may communicate with a BS 205b (operated by the second operator) using the SIM B 210b via a radio link 202b. In some aspects, the UE 215 may use the same radio access technology (e.g., NR or NR-U) for communication with the BS 205a and the BS 205b. In other aspects, the UE 215 may use one radio access technology (e.g., NR or NR-U) for communication with the BS 205a and another radio access technology (e.g., LTE) for communication with the BS 205b. Although FIG. 2 illustrates the UE 215 communicates with different BSs 205 using the SIM A 210a and the SIM B 210b, it should be understood that in other examples the UE 215 may communicate with the same BS. For instance, the UE 215 may communicate with the same BS 205a for the first subscription 212a via the SIM A 210a and for the second subscription 212b via the SIM B 210b.

Figure 3:
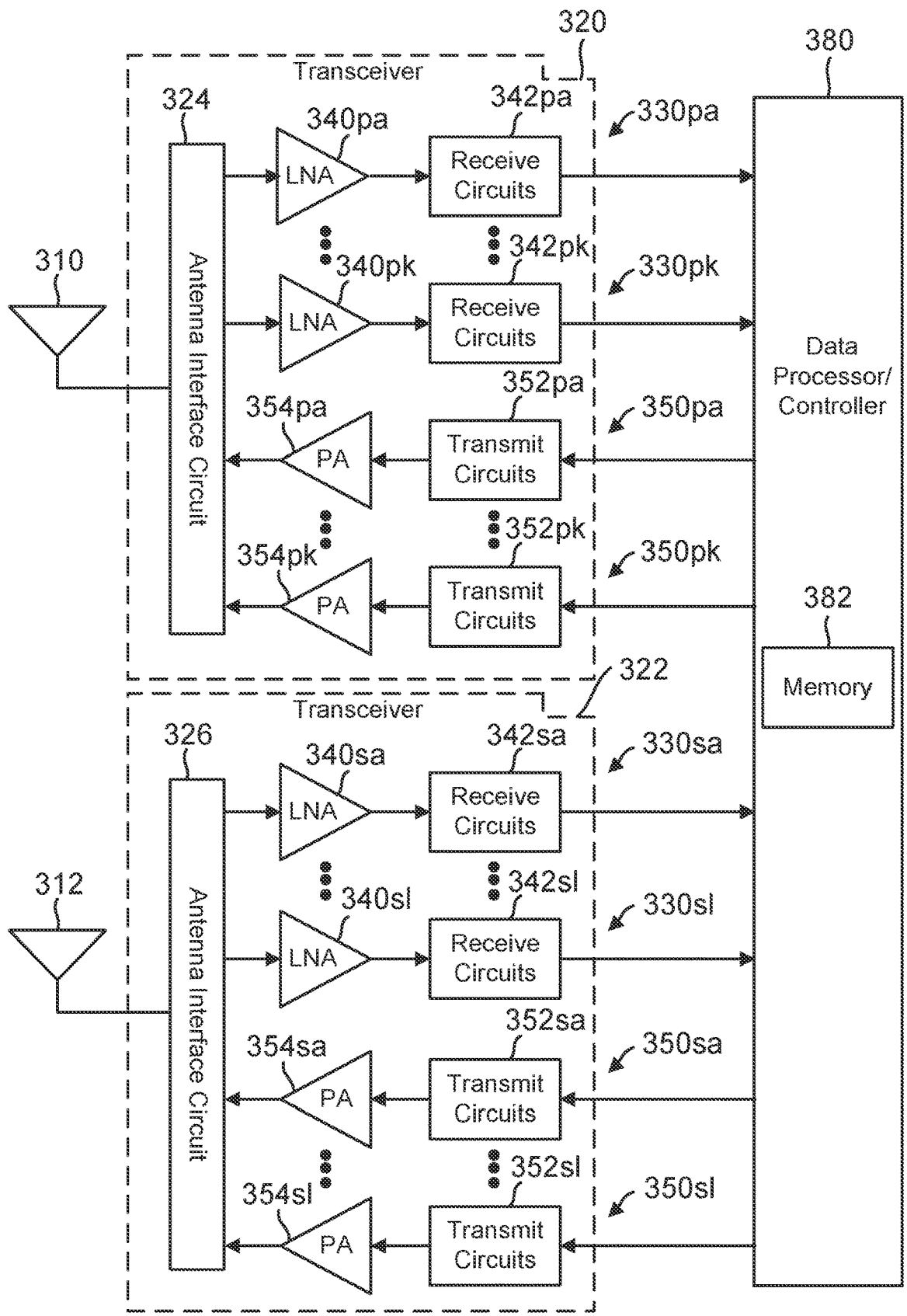
FIG. 3 is a block diagram of user equipment (EU) hardware, including multiple radio frequency (RF) chains, according to some aspects of the present disclosure.

In some aspects, the UE 215 may operate in a DSDS mode, where both SIMs 210a and 210b can be on standby (in an idle mode) waiting to begin communications. When a communication is established on one SIM (e.g., the SIM A 210a), the other SIM (e.g., the SIM B 210b) is no longer active. That is, one SIM may be active at a given time. For instance, both SIMs 210 may share a single transceiver and/or RF chain (e.g., a transceiver 320 as shown in FIG. 3) at the UE 215 for communications with corresponding network(s). In other aspects, the UE 215 may operate in a DSDA mode, where the UE 215 may simultaneously connect to the same network or different networks via the SIM A 210a and the SIM B 210b. That is, both SIM A 210a and SIM B 210b may have active communications at the same time. For instance, the UE 215 may have multiple transceiver and/or RF chains (e.g., transceivers 320, 322 as shown in FIG. 3), where each of the SIM A 210a and the SIM B 210b may utilize one of the transceiver and/or RF chains at the same time for concurrent communications.

In some aspects, the radio link 202a between the UE 215 and the BS 205a and the radio link 202b between the UE 215 and the BS 205b may be over orthogonal bands such as FR1/FR2 or low band/high band FR1. Of course, any combination of radio links 202 is possible, and the radio links may even take place using different radio access technologies. For instance, radio link 202 a may carry communications according to 5G protocols, whereas radio link 202b may carry communications according to LTE protocols. Furthermore, one or both of the radio links 202 may support communications in a NSA mode or an SA mode.

Figure 10:
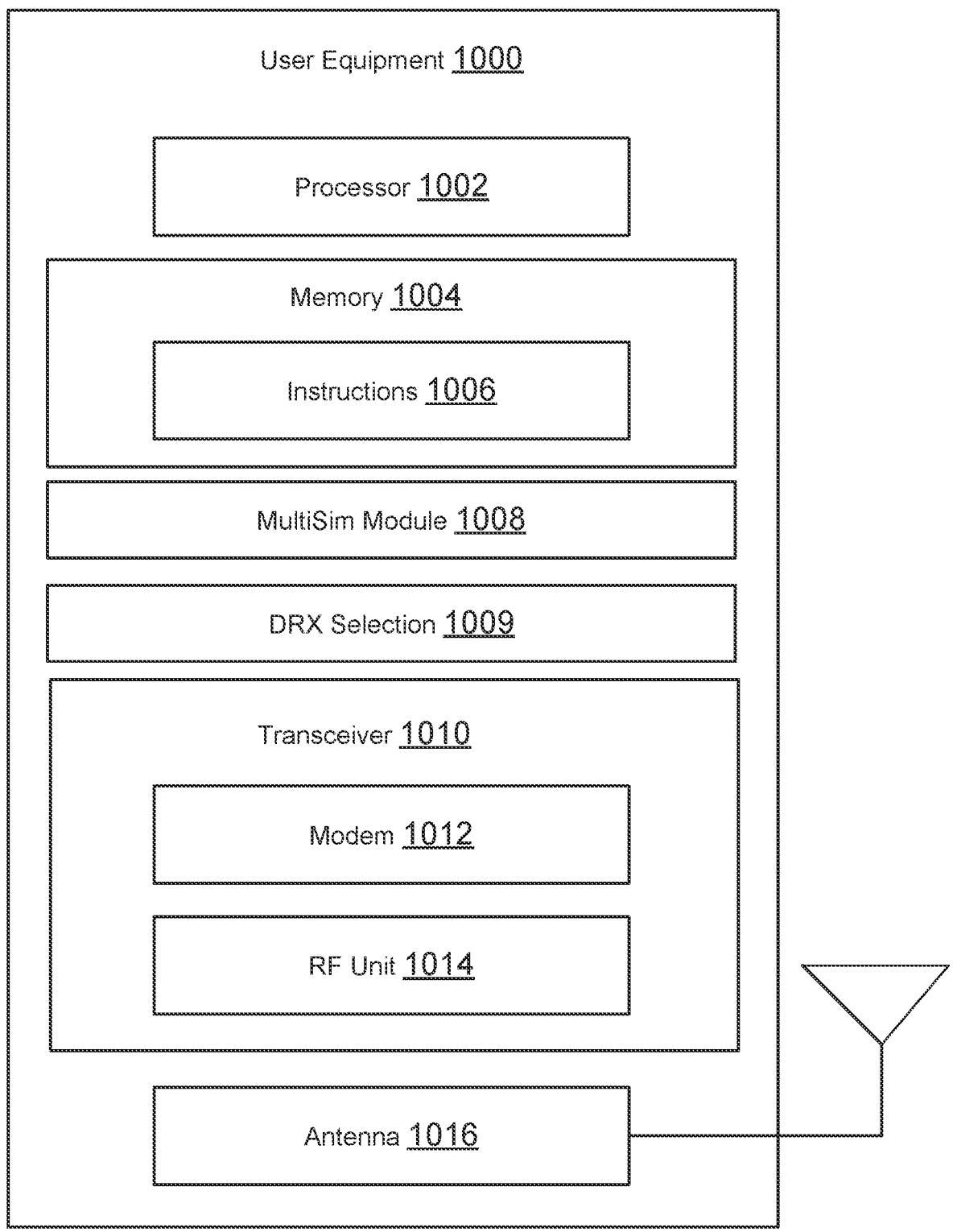
FIG. 10 illustrates a block diagram of a user equipment (UE) according to some aspects of the present disclosure.

FIG. 3 illustrates an example hardware architecture for RF chains, which may be implemented within UE 115 (FIG. 1), UE 215 (FIG. 2), or UE 1000 (FIG. 10). In this exemplary design, the hardware architecture includes a transceiver 320 coupled to a first antenna 310, a transceiver 322 coupled to a second antenna 312, and a data processor/controller 380. Transceiver 320 includes multiple (K) receivers 330pa to 330pk and multiple (K) transmitters 350pa to 350pk to support multiple frequency bands, multiple radio technologies, carrier aggregation, etc. Transceiver 322 includes L receivers 330sa to 330sl and L transmitters 350sa to 350sl to support multiple frequency bands, multiple radio technologies, carrier aggregation, receive diversity, multiple-input multiple-output (MIMO) transmission from multiple transmit antennas to multiple receive antennas, etc. During DSDA operation, and in an Off duration, shared hardware at the processor/controller 380 may sleep, thereby saving power. Similarly, during an On duration in DSDS mode, shared hardware at the processor/controller 380 may avoid resource contention, according to various embodiments.

In the exemplary design shown in FIG. 3, each receiver 330 includes an LNA 340 and receive circuits 342. For data reception, antenna 310 receives signals from base stations and/or other transmitter stations and provides a received RF signal, which may be routed through an antenna interface circuit 324 and presented as an input RF signal to a selected receiver. Antenna interface circuit 324 may include switches, duplexers, transmit filters, receive filters, matching circuits, etc. The description below assumes that receiver 330pa is the selected receiver, though the described operations apply equally well to any of the other receivers 330. Within receiver 330pa, an LNA 340pa amplifies the input RF signal and provides an output RF signal. Receive circuits 342pa downconvert the output RF signal from RF to baseband, amplify and filter the downconverted signal, and provide an analog input signal to data processor 380. Receive circuits 342pa may include mixers, filters, amplifiers, matching circuits, an oscillator, a local oscillator (LO) generator, a phase locked loop (PLL), etc. Each remaining receiver 330 in transceivers 320 and 322 may operate in a similar manner as receiver 330pa.

In the exemplary design shown in FIG. 3, each transmitter 350 includes transmit circuits 352 and a power amplifier (PA) 354. For data transmission, data processor 380 processes (e.g., encodes and modulates) data to be transmitted and provides an analog output signal to a selected transmitter. The description below assumes that transmitter 350pa is the selected transmitter, though the described operations apply equally well to any of the other transmitters 350. Within transmitter 350pa, transmit circuits 352pa amplify, filter, and upconvert the analog output signal from baseband to RF and provide a modulated RF signal. Transmit circuits 352pa may include amplifiers, filters, mixers, matching circuits, an oscillator, an LO generator, a PLL, etc. A PA 354pa receives and amplifies the modulated RF signal and provides a transmit RF signal having the proper output power level. The transmit RF signal may be routed through antenna interface circuit 324 and transmitted via antenna 310. Each remaining transmitter 350 in transceivers 320 and 322 may operate in a similar manner as transmitter 350pa.

FIG. 3 shows an exemplary design of receiver 330 and transmitter 350. A receiver and a transmitter may also include other circuits not shown in FIG. 3, such as filters, matching circuits, etc. All or a portion of transceivers 320 and 322 may be implemented on one or more analog (ICs, RF ICs (RFICs), mixed-signal ICs, etc. For example, LNAs 340 and receive circuits 342 within transceivers 320 and 322 may be implemented on multiple IC chips or on the same IC chip. The circuits in transceivers 320 and 322 may also be implemented in other manners.

Data processor/controller 380 may perform various functions for wireless device 110. For example, data processor 380 may perform processing for data being received via receivers 330 and data being transmitted via transmitters 350. Controller 380 may control the operation of the various circuits within transceivers 320 and 322. A memory 382 may store program codes and data for data processor/controller 380. Data processor/controller 380 may be implemented on one or more application specific integrated circuits (ASICs) and/or other ICs.

In one example, transceiver 320 may be adapted to provide operation in FR1, and transceiver 322 may be adapted to provide operation and in FR2. Furthermore in this example, an RF chain may refer to an RF path that is used by the UE to communicate with a cell. For instance, when communicating within FR1, an RF chain may include antenna 310, antenna interface circuit 324, and any of the LNAs, PAs, receive circuits, and transmit circuits (i.e., the hardware from the antenna 310 to the baseband connection input/output to the data processor 380). Similarly, an FR2 RF chain may include the hardware at transceiver 322 from the antenna 312 to the baseband connection input/output with the data processor 380.

The UE may include software logic that assigns one of the transceivers 320, 322 to a particular SIM and the other one of the transceivers to the other SIM in a dual SIM implementation. This may be true in a DSDA mode or in a DSDS mode. In an example DSDA mode in which one SIM is camped on FR1 and the other SIM is camped on FR2, the SIMs may be assigned to different transceivers and, thus, their operation may be independent and without any RF coexistence mitigation at the software level. In another DSDA example, both SIMs may be assigned to transceiver 320, with the SIMs using different bands within FR1. Even though the SIMs may share RF chains, the two bands are not expected to interfere, and as long as the hardware can tune to both bands concurrently, the operation of each SIM may be independent and without any RF coexistence mitigation at the software level. In some DSDS modes, the logic in the UE may assign both SIMs to both transceivers 320, 322 to ensure that both systems have access to FR1 and FR2. Furthermore, the software logic may select desired DRX parameter values based at least in part on whether the UE operates in DSDA mode or DSDS mode.

Figure 4:
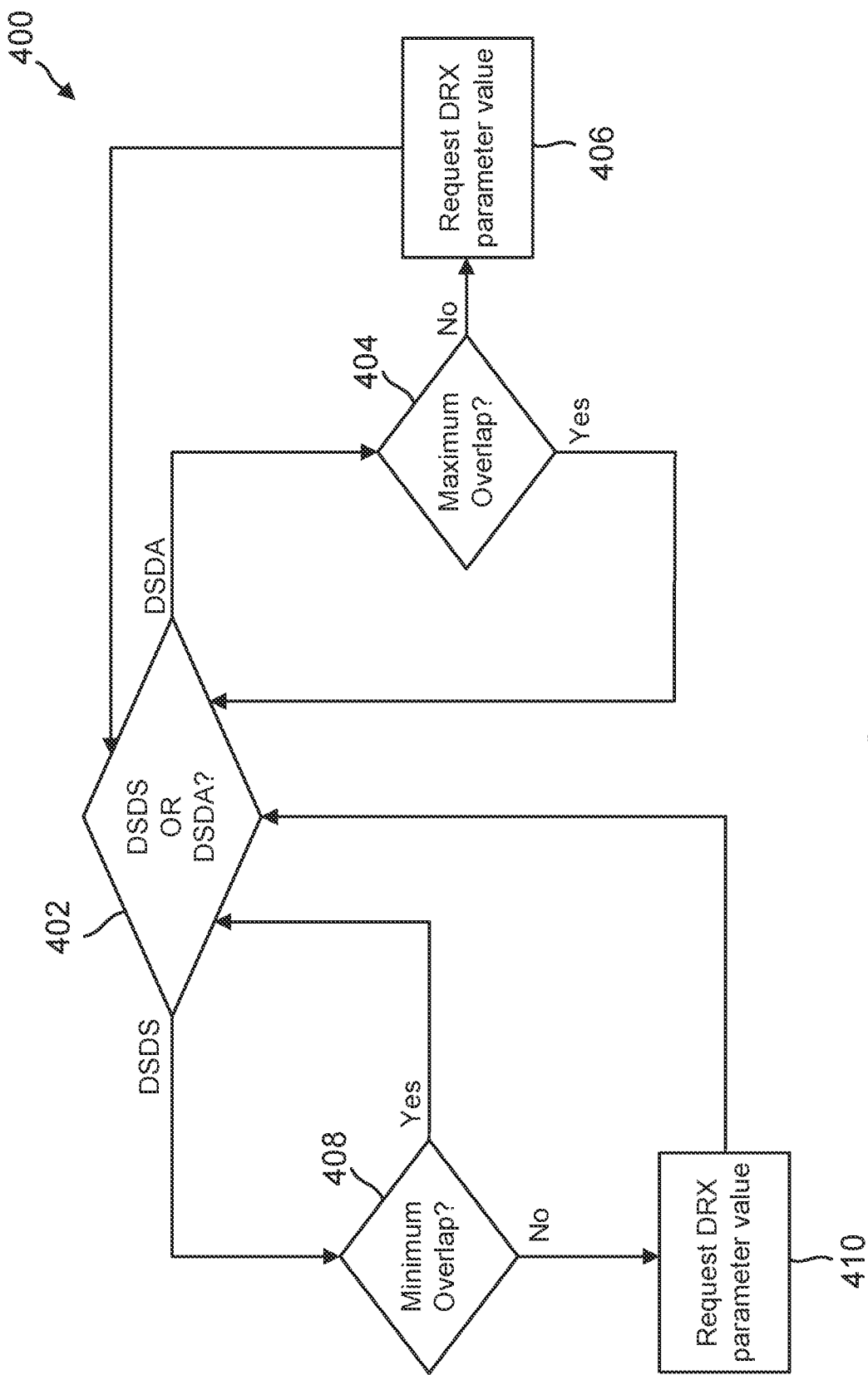
FIG. 4 is a flow diagram of a wireless communication method according to some aspects of the present disclosure.

FIG. 4 is a flowchart of a communication method 400 that utilizes multiple subscriptions according to some aspects of the present disclosure. The method 400 may be performed by a MultiSim UE (e.g., the UEs 115 and/or 215), and the method 400 may employ similar mechanisms as discussed above in relation to FIGS. 1-3. In some aspects, the UE 215 may utilize one or more components, such as the processor 1102, the memory 1104, the MultiSim module 1108, the DRX selection module 1109, the transceiver 1110, the modem 1112, and the one or more antennas 1116 of FIG. 11, to execute the actions of method 400. As illustrated, the method 400 includes a number of enumerated actions, but aspects of the method 400 may include additional actions before, after, and in between the enumerated actions. In some aspects, one or more of the enumerated actions may be omitted or performed in a different order.

In the method 400, the UE 215 may have a first subscription for wireless services from a first operator (e.g., operating the BS 205*a*) and a second subscription for wireless services from a second operator (e.g., operating the BS 205*b*). In some instances, the first operator and second operator may correspond to the same operator. In other instances, the first operator is different from the second operator. In some aspects, the first operator may assign the UE 215 with a first subscriber identity (e.g., IMSI) for communication using the first subscription, and the second operator may assign the UE 215 with a second subscriber identity (e.g., IMSI) for communication using the second subscription. The first subscriber identity and the second subscriber identity may be different, each uniquely identifying the UE 215 in a first network of the first operator and in a second network of the second operator, respectively. In some aspects, the UE 215 may communicate with the first network via the SIM A 210*a* for the first subscription using the first subscriber identity and may communicate with the second network via the SIM B 210*b* for the second subscription using the second subscriber identity. In some aspects, the SIM A 210*a* may include a SIM card storing the first subscriber identity and/or any associated information or key(s) for authorizing and/or authenticating the UE 215*a* in the first network, and the SIM B 210*a* may include a SIM card storing the second subscriber identity and/or any associated information or key(s) for authorizing and/or authenticating the UE 215*a* in the second network.

At action 402, the UE 215 determines to operate in a DSDA mode or a DSDS mode. For instance, as noted above, when certain frequency bands are available to the SIMs, the subscriptions may operate in a DSDA mode in a scenario in which both frequency bands may be tuned independently. Otherwise, the subscriptions may operate in DSDS mode. Of course, the scope of implementations is not limited to only that reason for operating in DSDA or DSDS mode, as any reason for choosing one mode or the other as appropriate may be used.

At action 404, the UE 215 has determined to operate in a DSDA mode. Accordingly, the UE 215 may prefer to operate so that there is maximum overlap for the DRX on cycles. Thus, the UE 215 may check the DRX parameters at action 404 to determine whether there is maximum overlap.

Figure 5:
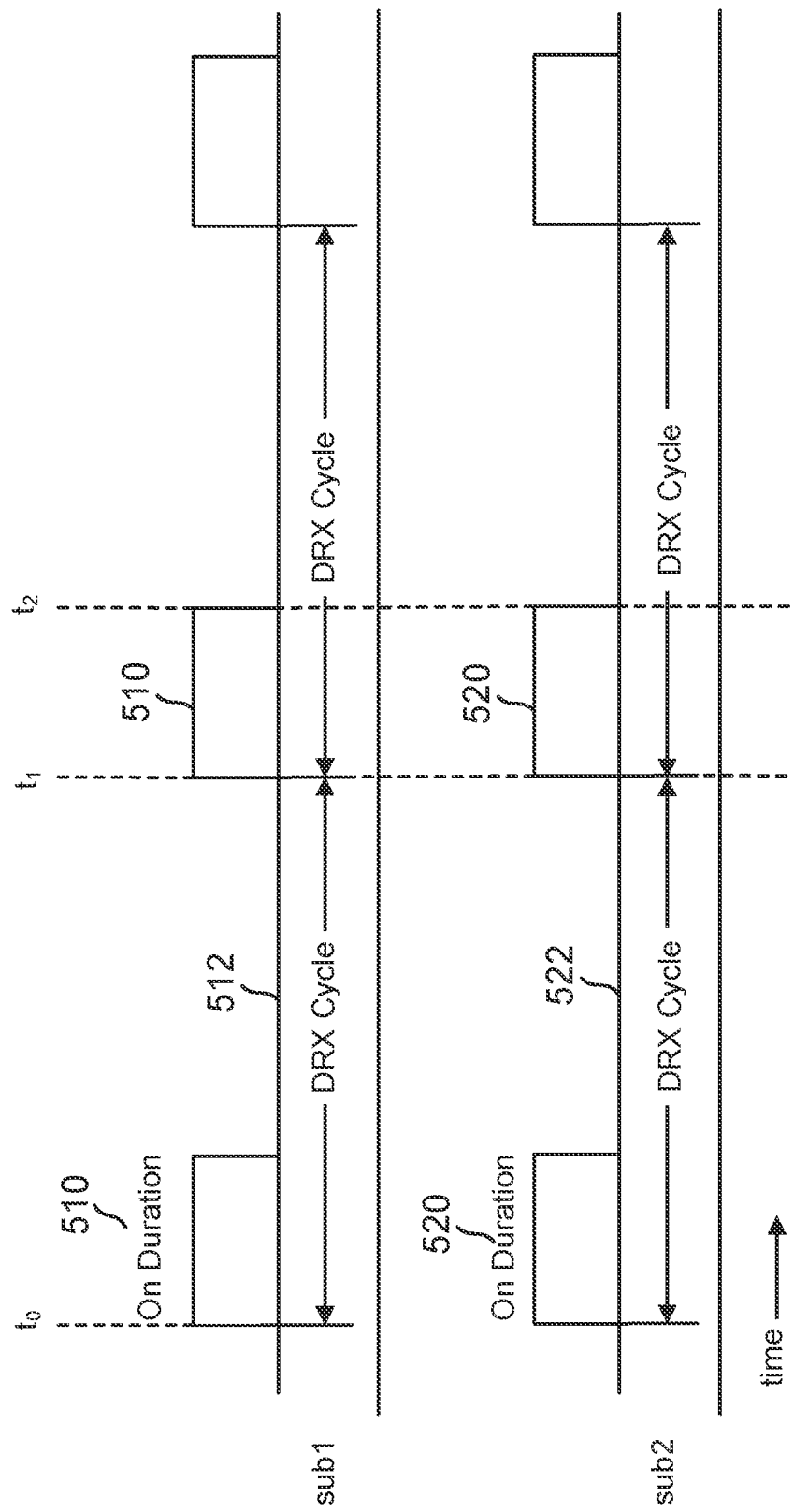
FIG. 5 is a diagram of discontinuous reception (DRX) On duration overlap according to some aspects of the present disclosure.

An example of maximum overlap as shown in FIG. 5, according to one embodiment. The top cycle is for a first subscription, and the bottom cycle is for a second subscription, each subscription corresponding to a SIM, as described above with respect to FIG. 2. A particular DRX cycle includes an On duration 510, 520 as well as an Off duration 512, 522. As shown in FIG. 5, the On durations 510, 520 are aligned and coextensive for subscription 1 and subscription 2. In other words, FIG. 5 shows both On durations 510, 520 beginning at time t1 and ending at time t2.

The On durations 510, 520 may be set for overlap based on DRX parameters Cycle Duration and Start Offset. The Cycle Duration parameter defines the time between t1 and t2. The Start Offset defines a time that the DRX cycle begins, which is shown in FIG. 5 as time t0. In this instance, the cycles for both subscriptions 1 and 2 both begin at time t0, and they include a same Cycle Duration, which leads to 100% overlap. However, maximum overlap does not require 100% overlap in every scenario. Rather, overlap less than 100% (partial overlap) may be the greatest amount of overlap that is available in some instances in which matching Cycle Duration and/or Start Offset may not be available for the cells that are serving subscriptions 1 and 2.

At action 406, the UE 215 requests one or more DRX parameter values in an attempt to increase an amount of overlap should the overlap be below a particular desired value. For instance, the UE 215 may send a UE Assistance Information (UAI) message to a cell serving subscription 1, where the UAI message requests values for Cycle Duration and Start Offset to match those same values used by the cell serving subscription 2. The cell serving subscription 1 is not required to honor the request in some instances, though it may make an effort to accommodate the request. Thus, the cell serving subscription 1 may or may not change the Start Offset or Cycle Duration parameter values. In an instance in which the cell does not change either or both of the Start Offset or Cycle Duration parameter values, the UE 215 may cease to make a further request or may wait a particular amount of time before making a new request. Additionally or alternatively, the UE 215 may send a message to the cell serving subscription 2 to request values for Cycle Duration and/or Start Offset to match the values used by the cell serving subscription 1. In fact, action 406 may include the UE 215 sending a message to either or both of the cells as appropriate.

Figure 6:
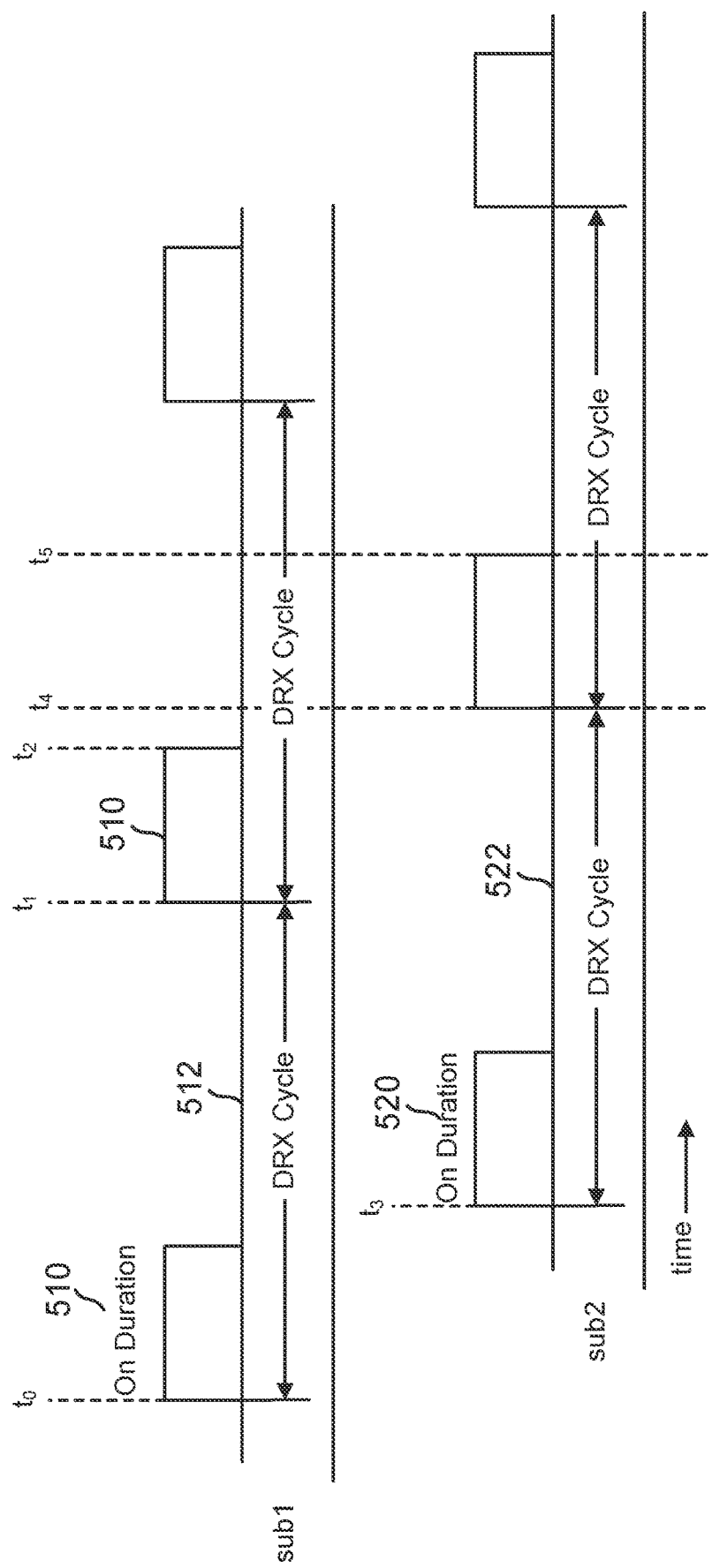
FIG. 6 is a diagram of DRX On duration overlap according to some aspects of the present disclosure.

Returning now to FIG. 4, at action 408, the UE 215 has determined to operate in DSDS mode, and it checks the DRX parameters (e.g., Start Offset and Cycle Duration) to determine whether it is operating using a minimum amount of overlap. FIG. 6 indicates an example of minimum overlap according to one embodiment. In FIG. 6, the cycles for subscription 1 and subscription 2 have a different Start Offset, with the cycle for subscription 2 beginning now at time t3, which is some time after time t0. For both subscription 1 and subscription 2, the On durations 510, 520 are the same because the time elapsed between t1 and t2 is the same as the time elapsed between t4 and t5. However, because of the difference between times t0 and t3, the On durations 510, 520 are not aligned or coextensive, and there is 0% overlap.

The scope of embodiments is not limited to a 0% overlap for a minimum overlap. Rather, a minimum overlap may be confined to what is possible for a given scenario. For instance, when 0% overlap may not be achieved, the UE 215 may strive to reduce an amount of overlap given possible DRX configurations. Thus, at action 410, the UE 215 may request parameter values for Cycle Duration and/or Start Offset for subscription 1 to reduce or eliminate On duration overlap with respect to subscription 2. For instance, the UE 215 may send a UAI message to a cell serving subscription 1 to request desired DRX parameters. Also, the scope of embodiments may include the UE 215 sending a message to either or both of the cells as appropriate.

Once again, the cell receiving the request message may or may not honor the request or may make an effort, or no effort, to accommodate the UE 215. The UE 215 may then cease to send a request to either or both of the cells or may wait a particular amount of time before sending one or more new requests.

Figure 7:
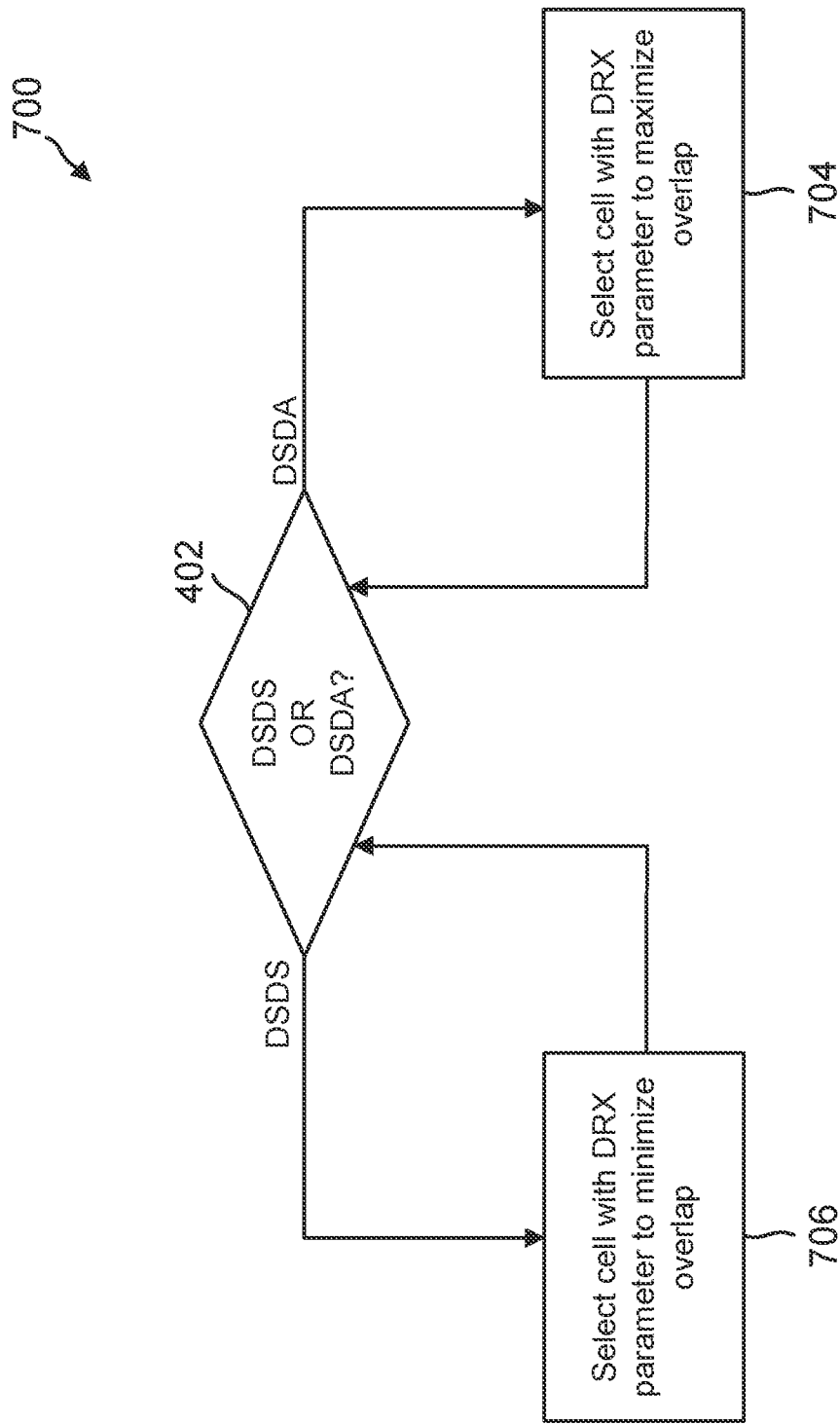
FIG. 7 is a flow diagram of a wireless communication method according to some aspects of the present disclosure.

FIG. 7 is a flowchart of a communication method 700 that utilizes multiple subscriptions according to some aspects of the present disclosure. The method 700 may be performed by a MultiSim UE (e.g., the UEs 115 and/or 215), and the method 700 may employ similar mechanisms as discussed above in relation to FIGS. 1-3. In some aspects, the UE 215 may utilize one or more components, such as the processor 1102, the memory 1104, the MultiSim module 1108, the DRX selection module 1109, the transceiver 1110, the modem 1112, and the one or more antennas 1116 of FIG. 11, to execute the actions of method 700. As illustrated, the method 700 includes a number of enumerated actions, but aspects of the method 700 may include additional actions before, after, and in between the enumerated actions. In some aspects, one or more of the enumerated actions may be omitted or performed in a different order.

As described in more detail below, the UE 215 proactively reselects to a cell on one of the subscriptions in order to achieve a desired On duration overlap based on the UE's operating mode of DSDS vs DSDA.

At action 704, the UE 215 has decided to operate in DSDA mode. Accordingly, it selects a cell with DRX parameters to maximize overlap at action 704. In one example, the UE 215 may evaluate selection criteria for a plurality of cells for the first SIM, and the selection criteria includes at least one DRX parameter value, such as Cycle Duration and/or Start Offset. The UE 215 may then select a first cell based at least in part on the first cell complying with the DRX parameter value. In fact, the UE 215 may do the same for the second SIM if appropriate, with subscription 1 and subscription 2 being serviced by either the same or different cells.

Continuing with action 704, for a subscription in idle mode, the UE 215 may prioritize reselection to a cell meeting a desired DRX parameter value either by using the DRX parameter value while evaluating the selection criteria or by selecting a suitable cell when multiple cells satisfy the selection criteria. For a subscription in connected mode, the UE can use an event report mechanism, or if a conditional handover configuration is configured by the network, the UE 215 may use the conditional handover to select a cell with a desired DRX parameter value.

At action 706, the UE 215 has decided to operate in DSDS mode. Accordingly, it selects a cell with DRX parameter values to minimize overlap. Action 706 may be performed similarly to action 704, including evaluating selection criteria and/or using an event report mechanism or a conditional handover as appropriate to achieve a desired DRX parameter value.

Figure 8:
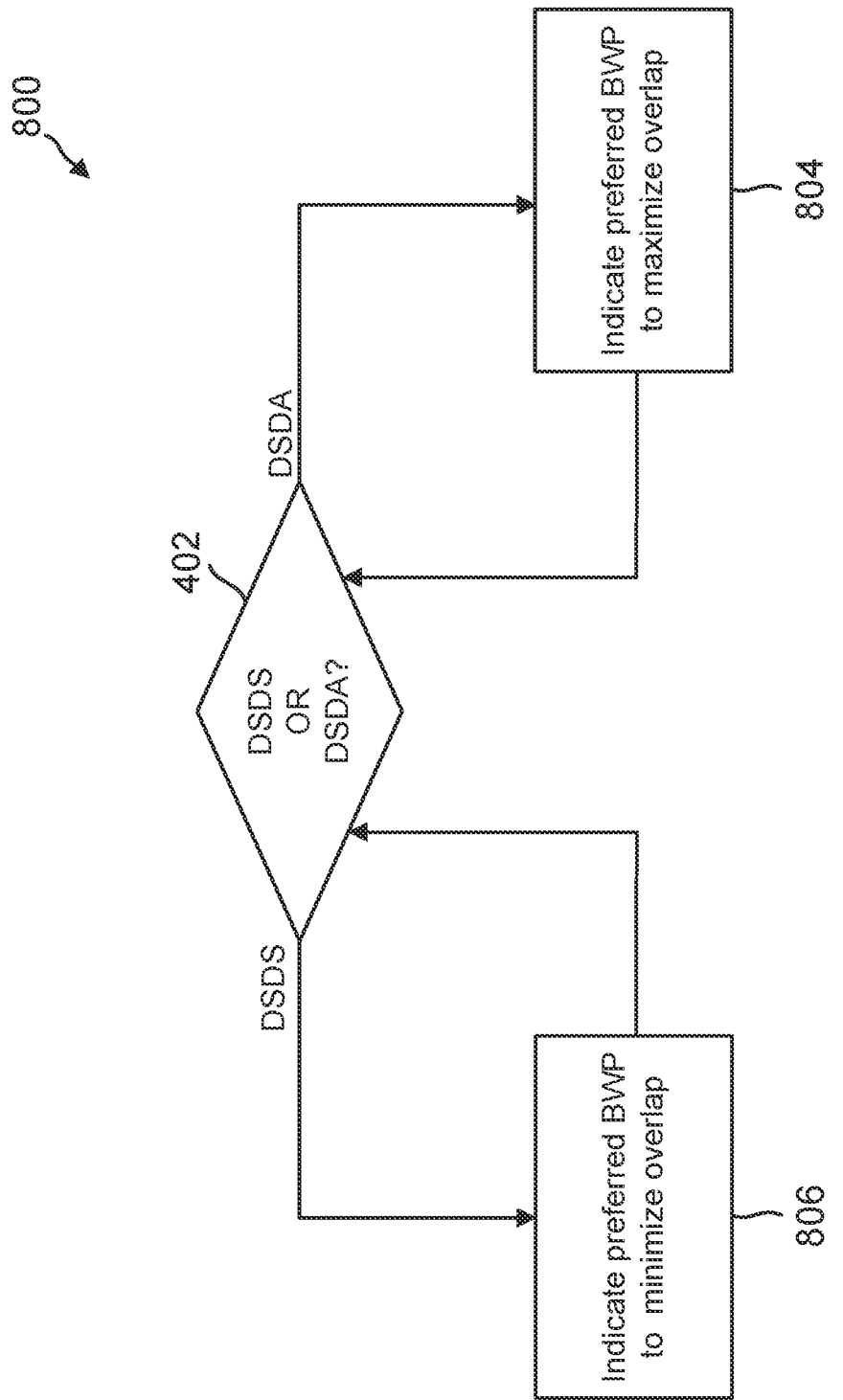
FIG. 8 is a flow diagram of a wireless communication method according to some aspects of the present disclosure.

FIG. 8 is a flowchart of a communication method 800 that utilizes multiple subscriptions according to some aspects of the present disclosure. The method 800 may be performed by a MultiSim UE (e.g., the UEs 115 and/or 215), and the method 800 may employ similar mechanisms as discussed above in relation to FIGS. 1-3. In some aspects, the UE 215 may utilize one or more components, such as the processor 1102, the memory 1104, the MultiSim module 1108, the DRX selection module 1109, the transceiver 1110, the modem 1112, and the one or more antennas 1116 of FIG. 11, to execute the actions of method 800. As illustrated, the method 800 includes a number of enumerated actions, but aspects of the method 800 may include additional actions before, after, and in between the enumerated actions. In some aspects, one or more of the enumerated actions may be omitted or performed in a different order.

At method 800, different bandwidth parts (BWPs) may be configured with different DRX configurations. Currently, a mechanism for a UE, such as UE 215, to indicate a preferred BWP is being standardized. In method 800, the UE 215 can indicate a preferred BWP having a suitable DRX configuration to the network.

At action 804, the UE 215 has determined to operate in DSDA mode. The UE evaluates a plurality of bandwidth parts for conformance with the DRX parameter and selects a first one of the BWPs based on the evaluating. For instance, the UE 215 may evaluate DRX configurations associated with each of the BWPs and select one of the BWPs having a DRX configuration that maximizes On duration overlap. Furthermore, the UE 215 may select a BWP for the first subscription and a BWP for the second subscription using DRX configuration to achieve a desired amount of overlap.

At action 806, the UE 215 has determined to operate in DSDS mode. Action 806 includes indicating a preferred BWP to minimize overlap. Action 806 may be performed similarly to action 804, including selecting BWPs for either or both of the first and second subscriptions based on DRX parameters associated with the BWPs to achieve the desired amount of overlap.

Figure 9:
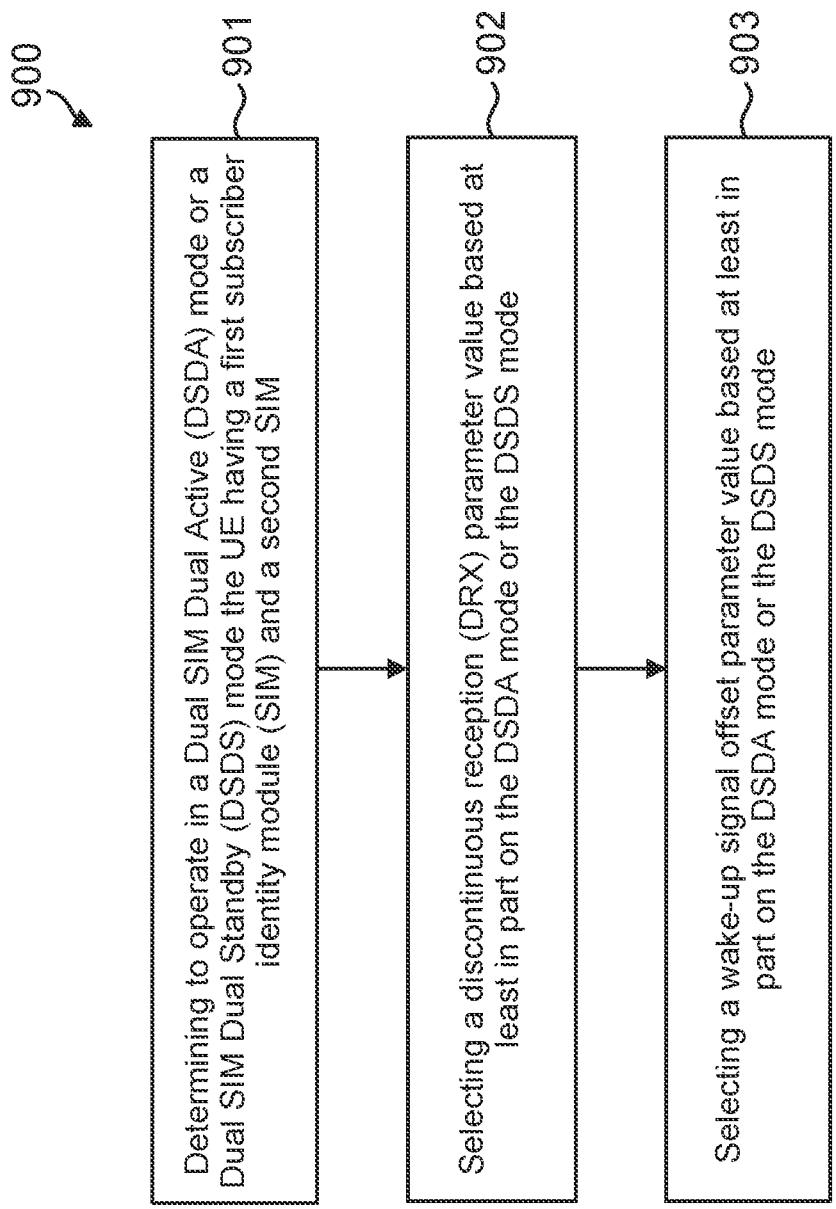
FIG. 9 is a flow diagram of a wireless communication method according to some aspects of the present disclosure.

FIG. 9 is a flowchart of a communication method 900 that utilizes multiple subscriptions according to some aspects of the present disclosure. The method 900 may be performed by a MultiSim UE (e.g., the UEs 115 and/or 215), and the method 900 may employ similar mechanisms as discussed above in relation to FIGS. 1-3. In some aspects, the UE 215 may utilize one or more components, such as the processor 1102, the memory 1104, the MultiSim module 1108, the DRX selection module 1109, the transceiver 1110, the modem 1112, and the one or more antennas 1116 of FIG. 11, to execute the actions of method 900. As illustrated, the method 700 includes a number of enumerated actions, but aspects of the method 900 may include additional actions before, after, and in between the enumerated actions. In some aspects, one or more of the enumerated actions may be omitted or performed in a different order.

In this example, method 900 includes selecting appropriate DRX parameters based on a DSDA or DSDS operating mode of the UE 215. As noted above, when in DSDA mode, a UE may prefer maximum overlap of On durations for both subscriptions. The maximum overlap may include only partial overlap or may include 100% overlap in which the On durations are aligned and coextensive, depending on which DRX configurations are available by the network. In DSDA mode, working to increase overlap may save power by increasing an amount of time that shared hardware may sleep during the Off duration. Put another way, maximizing overlap of On duration may in some instances allow for maximizing overlap of the Off duration in which shared hardware may sleep. An advantage is that the UE may save power, leading to longer battery life in a mobile device.

By contrast, during DSDS mode, the UE may prefer minimum overlap of On durations. Minimum overlap may include both partial overlap and 0% overlap and may depend on which DRX configurations are available by the network. Minimizing overlap may reduce instances of resource conflict, thereby increasing performance of the UE.

At action 901, the UE determines to operate in a DSDA mode or in a DSDS mode. The UE has a first SIM and a second SIM, which may operate to provide a first subscription and a second subscription, respectively. As noted above, the UE may determine to operate in DSDA mode or in DSDS mode based at least in part on frequency bands that are available by the network or networks. When the two SIMs can tune the two frequency bands independently and without having to provide coexistence, then the UE may provide DSDA operation. In one example, the UE may operate in DSDA mode when a first SIM is associated with FR1 and the second SIM is associated with FR2. In an additional example, the UE may operate in a DSDA mode when the two SIMs are in FR1 but use non-interfering frequency bands within FR1. Otherwise, the UE may provide DSDS operation.

At action 902, the UE selects a DRX parameter value based at least in part on the DSDA mode or the DSDS mode. Examples are given above at FIGS. 4-8. For instance, the UE may request DRX configurations for either or both of subscription 1 and subscription 2 using, e.g., a UAI message or other appropriate signaling to make the request. In another example, the UE may select a cell using a DRX parameter as a selection criterion, or it may use an event report or a conditional handover to select a cell with a desired DRX configuration. In another example, the UE may select a BWP for either or both of the subscriptions based on desired DRX configurations associated with the BWPs. In any event, in DSDA mode, the UE may attempt to maximize overlap of the On duration and in DSDS mode the UE may attempt to minimize overlap of the On duration.

Figure 12:
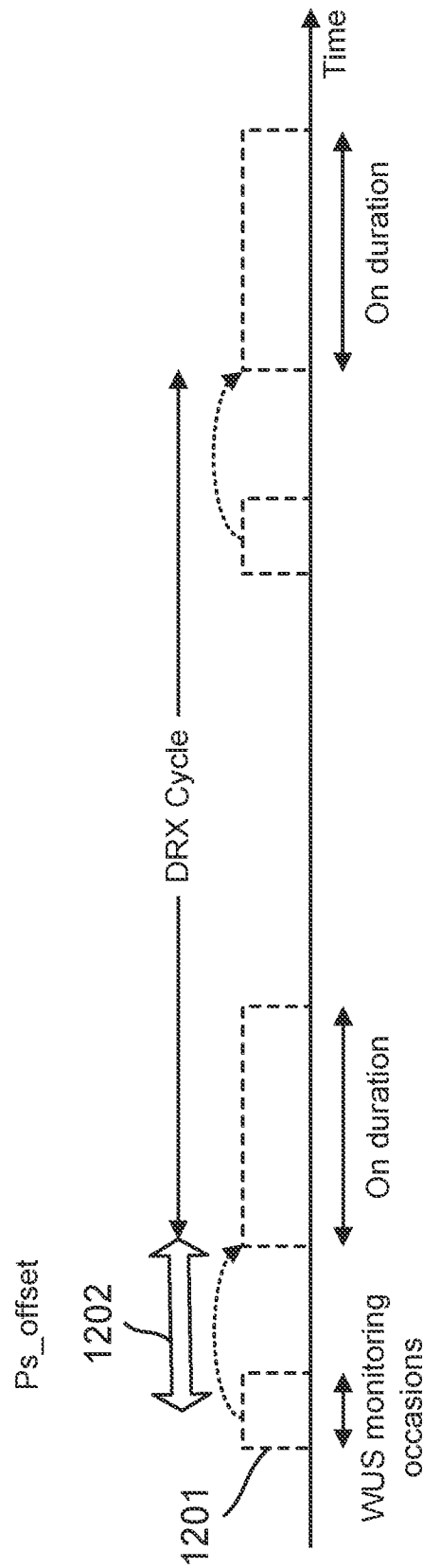
FIG. 12 is a diagram of a relationship between wake up signals and DRX On duration according to some aspects of the present disclosure.

At action 903, the UE selects a wake-up signal offset parameter value based at least in part on the DSDA mode or the DSDS mode. An example is shown in FIG. 12. FIG. 12 illustrates an example DRX cycle and wake-up signal 1201 for a single subscription, according to one embodiment. The parameter Ps_offset is illustrated as item 1202, and it is an amount of elapsed time from a middle of wake-up signal 1201 to a start of the next On duration. Overlap may be increased by aligning wake-up signals 1201 for the two subscriptions through selection of a desired Ps_offset 1202. Similarly, overlap may be decreased by staggering wake-up signal 1201 for the two subscriptions through selection of a desired Ps_offset 1202. Maximizing or minimizing overlap of the wake-up signal includes the same benefits as those described above that may be achieved through maximizing or minimizing overlap of the On durations of the DRX cycles.

The scope of implementations is not limited to the series of actions 901-903. Rather, other implementations may add, omit, rearrange, or modify various actions. For instance, one cell may drop or mobility may force one or more of the subscriptions to move to another cell having a different frequency band or standalone mode status. In that instance, the UE may perform method 900 again. In fact, the UE may perform method 900 as appropriate at power on, during normal operation, during mobility operations, based on user input, periodically, and at any other appropriate time.

FIG. 10 is a block diagram of an exemplary UE 1000 according to some aspects of the present disclosure. The UE 1000 may be a UE 115 or UE 215 as discussed above in FIGS. 1-3. As shown, the UE 1000 may include a processor 1002, a memory 1004, a MultiSim module 1008, a DRX selection module 1109, a transceiver 1010 including a modem subsystem 1012 and a radio frequency (RF) unit 1014, and one or more antennas 1016. These elements may be coupled with one another. The term "coupled" may refer to directly or indirectly coupled or connected to one or more intervening elements. For instance, these elements may be in direct or indirect communication with each other, for example via one or more buses.

The processor 1002 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 1002 may also be implemented as a combination of computing devices, e.g., a combination of a DSP and a microprocessor, a plurality of microprocessors, one or more microprocessors in conjunction with a DSP core, or any other such configuration.

The memory 1004 may include a cache memory (e.g., a cache memory of the processor 1002), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 1004 includes a non-transitory computer-readable medium. The memory 1004 may store, or have recorded thereon, instructions 1006. The instructions 1006 may include instructions that, when executed by the processor 1002, cause the processor 1002 to perform the operations described herein with reference to a UE 115, 215 in connection with aspects of the present disclosure, for example, aspects of FIGS. 1-9. Instructions 1006 may also be referred to as code, which may include any type of computer-readable statements.

The MultiSim module 1008 may be implemented via hardware, software, or combinations thereof. For example, the MultiSim module 1008 may be implemented as a processor, circuit, and/or instructions 1006 stored in the memory 1004 and executed by the processor 1002. The DRX selection module 1109 may be implemented with the MultiSim module 1108 or may be implemented separately from the MultiSim module 1108. The DRX selection module 1109 may communicate with one or more components of UE 1000 to implement various aspects of the present disclosure, for example, the methods described above with respect to FIGS. 4 and 7-9.

In some aspects, the MultiSim module 1008 may include multiple SIMs or SIM cards (e.g., 2, 3, 4, or more) similar to the SIMs 210. Each SIM may be configured to store information used for accessing a network, for example, to authenticate and identify the UE 1000 as a subscriber of the network. Some examples of information stored on a SIM may include, but not limited to, a subscriber identity such as an international mobile subscriber identity (IMSI) and/or information and/or key used to identify and authenticate the UE 1000 in a certain provider network. In some aspects, the UE 1000 may have a first subscription on a first SIM of the multiple SIMs and a second subscription on a second SIM of the multiple SIMs. The first subscription may identify the UE 1000 by a first subscriber identity, and the second subscription may identify the UE 1000 by a second subscriber identity.

As shown, the transceiver 1010 may include the modem subsystem 1012 and the RF unit 1014. The transceiver 1010 can be configured to communicate bi-directionally with other devices, such as the BSs 105 and 500. The modem subsystem 1012 may be configured to modulate and/or encode the data from the memory 1004, the MultiSim module 1008 according to a modulation and coding scheme (MCS), e.g., a low-density parity check (LDPC) coding scheme, a turbo coding scheme, a convolutional coding scheme, a digital beamforming scheme, etc. The RF unit 1014 may be configured to process (e.g., perform analog to digital conversion or digital to analog conversion, etc.) modulated/encoded data (e.g., PUSCH data, PUCCH UCI, MSG1, MSG3, etc.) or of transmissions originating from another source such as a UE 115, a BS 105, or an anchor. The RF unit 1014 may be further configured to perform analog beamforming in conjunction with the digital beamforming. Although shown as integrated together in transceiver 1010, the modem subsystem 1012 and the RF unit 1014 may be separate devices that are coupled together at the UE 1000 to enable the UE 1000 to communicate with other devices.

The RF unit 1014 may provide the modulated and/or processed data, e.g. data packets (or, more generally, data messages that may contain one or more data packets and other information), to the antennas 1016 for transmission to one or more other devices. The antennas 1016 may further receive data messages transmitted from other devices. The antennas 1016 may provide the received data messages for processing and/or demodulation at the transceiver 1010. The transceiver 1010 may provide the demodulated and decoded data (e.g., RRC configurations, MIB, PDSCH data and/or PDCCH DCIs, etc.) to the MultiSim module 1008 for processing. The antennas 1016 may include multiple antennas of similar or different designs in order to sustain multiple transmission links.

In an aspect, the UE 1000 can include multiple transceivers 1010 implementing different RATs (e.g., NR and LTE). In an aspect, the UE 1000 can include a single transceiver 1010 implementing multiple RATs (e.g., NR and LTE). In an aspect, the transceiver 1010 can include various components, where different combinations of components can implement different RATs.

Figure 11:
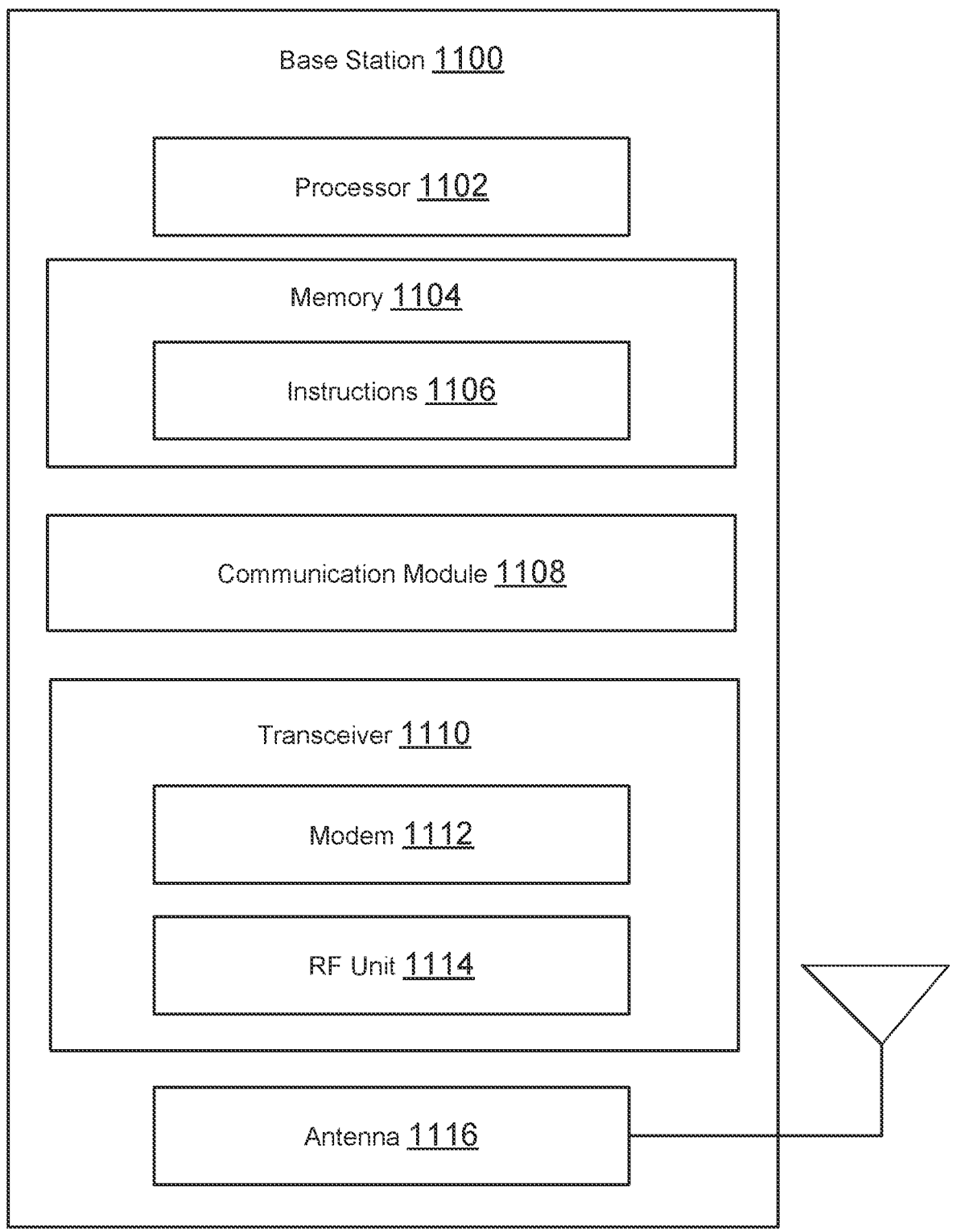
FIG. 11 illustrates a block diagram of a base station (BS) according to some aspects of the present disclosure.

FIG. 11 is a block diagram of an exemplary BS 1100 according to some aspects of the present disclosure. The BS 1100 may be a BS 105 or a BS 205 as discussed in FIGS. 1 and 2. As shown, the BS 1100 may include a processor 1102, a memory 1104, a communication module 1108, a transceiver 1110 including a modem subsystem 1112 and a RF unit 1114, and one or more antennas 1116. These elements may be coupled with one another. The term "coupled" may refer to directly or indirectly coupled or connected to one or more intervening elements. For instance, these elements may be in direct or indirect communication with each other, for example via one or more buses.

The processor 1102 may have various features as a specific-type processor. For example, these may include a CPU, a DSP, an ASIC, a controller, a FPGA device, another hardware device, a firmware device, or any combination thereof configured to perform the operations described herein. The processor 1102 may also be implemented as a combination of computing devices, e.g., a combination of a DSP and a microprocessor, a plurality of microprocessors, one or more microprocessors in conjunction with a DSP core, or any other such configuration.

The memory 1104 may include a cache memory (e.g., a cache memory of the processor 1102), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 1104 may include a non-transitory computer-readable medium. The memory 1104 may store instructions 1106. The instructions 1106 may include instructions that, when executed by the processor 1102, cause the processor 1102 to perform operations described herein, for example, aspects of FIGS. 1 and 2. Instructions 1106 may also be referred to as program code. The program code may be for causing a wireless communication device to perform these operations, for example by causing one or more processors (such as processor 1102) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The communication module 1108 may be implemented via hardware, software, or combinations thereof. For example, the communication module 1108 may be implemented as a processor, circuit, and/or instructions 1106 stored in the memory 1104 and executed by the processor 1102. In some examples, the communication module 1108 can be integrated within the modem subsystem 1112. For example, the communication module 1108 can be implemented by a combination of software components (e.g., executed by a DSP or a general processor) and hardware components (e.g., logic gates and circuitry) within the modem subsystem 1112. The communication module 1108 may communicate with one or more components of BS 1100 to implement various aspects of the present disclosure, for example, aspects of FIGS. 1 and 2.

As shown, the transceiver 1110 may include the modem subsystem 1112 and the RF unit 1114. The transceiver 1110 can be configured to communicate bi-directionally with other devices, such as the UEs 115, 215 and/or BS 1100 and/or another core network element. The modem subsystem 1112 may be configured to modulate and/or encode data according to a MCS, e.g., a LDPC coding scheme, a turbo coding scheme, a convolutional coding scheme, a digital beamforming scheme, etc. The RF unit 1114 may be configured to process (e.g., perform analog to digital conversion or digital to analog conversion, etc.) modulated/encoded data (e.g., RRC configurations, MIB, PDSCH data and/or PDCCH DCIs, etc.) from the modem subsystem 1112 (on outbound transmissions) or of transmissions originating from another source such as a UE 115, 215, and/or UE 1100. The RF unit 1114 may be further configured to perform analog beamforming in conjunction with the digital beamforming. Although shown as integrated together in transceiver 1110, the modem subsystem 1112 and/or the RF unit 1114 may be separate devices that are coupled together at the BS 1100 to enable the BS 1100 to communicate with other devices.

The RF unit 1114 may provide the modulated and/or processed data, e.g. data packets (or, more generally, data messages that may contain one or more data packets and other information), to the antennas 1116 for transmission to one or more other devices. The antennas 1116 may further receive data messages transmitted from other devices and provide the received data messages for processing and/or demodulation at the transceiver 1110. The transceiver 1110 may provide the demodulated and decoded data (e.g., PUSCH data, PUCCH UCL, MSG1, MSG3, etc.) to the communication module 1108 for processing. The antennas 1116 may include multiple antennas of similar or different designs in order to sustain multiple transmission links.

In an aspect, the BS 1100 can include multiple transceivers 1110 implementing different RATs (e.g., NR and LTE). In an aspect, the BS 1100 can include a single transceiver 1110 implementing multiple RATs (e.g., NR and LTE). In an aspect, the transceiver 1110 can include various components, where different combinations of components can implement different RATs.

Further aspects of the present disclosure include the following clauses:

1. A method of wireless communication performed by a user equipment (UE), the method comprising:
    determining to operate in a Dual SIM Dual Active (DSDA) mode or a Dual SIM Dual Standby (DSDS) mode, the UE having a first subscriber identity module (SIM) and a second SIM, and
    selecting a discontinuous reception (DRX) parameter value based at least in part on the DSDA mode or the DSDS mode.

2. The method of clause 1, wherein determining to operate in the DSDA mode or the DSDS mode comprises:
    selecting the DSDA mode in response to the first SIM being associated with a first frequency range and the second SIM being associated with a second frequency range.

3. The method of clause 2, wherein the first frequency range comprises frequency range 1 (FR1), and wherein the second frequency range comprises frequency range 2 (FR2).

4. The method of clause 1, wherein selecting the DRX parameter value comprises:
    transmitting a UE Assistance Information message to a cell associated with the first SIM, the UE Assistance Information message specifying either or both of DRX cycle duration and start offset.

5. The method of clause 4, wherein selecting the DRX parameter value comprises:
    transmitting an additional UE Assistance Information message to a cell associated with the second SIM, the UE Assistance Information message specifying either or both of DRX cycle duration and start offset.

6. The method of clause 1, wherein selecting the DRX parameter value comprises:
    evaluating selection criteria for a plurality of cells for the first SIM, wherein the selection criteria include the DRX parameter value; and
    selecting a first cell of the plurality of cells based at least in part on the first cell complying with the DRX parameter value.

7. The method of clause 6, wherein selecting the DRX parameter value comprises:
    evaluating the selection criteria for an additional plurality of cells for the second SIM; and
    selecting a second cell of the additional plurality of cells based at least in part on the second cell complying with the DRX parameter value.

8. The method of clause 1, wherein selecting the DRX parameter value comprises:
    for the first SIM, evaluating a plurality of bandwidth parts for conformance with the DRX parameter value; and
    selecting a first one of the bandwidth parts based at least in part on the evaluating.

9. The method of clause 8, wherein selecting the DRX parameter value comprises:
    for the second SIM, evaluating an additional plurality of bandwidth parts for conformance with the DRX parameter value; and
    selecting a second one of the bandwidth parts of the additional plurality of bandwidth parts based at least in part on evaluating the additional plurality of bandwidth parts.

10. The method of clause 1, further comprising:
    selecting a wake-up signal offset parameter value based at least in part on the DSDA mode or the DSDS mode.

11. A user equipment (UE) comprising:
    a first subscriber identity module (SIM) associated with a first service provider subscription and a second SIM associated with a second service provider subscription; and
    a processor configured to access the first SIM and the second SIM, the processor further configured to:
        determine to operate in a Dual SIM Dual Active (DSDA) mode in which both the first SIM and the second SIM are available for handling calls simultaneously; and
        setting a discontinuous reception (DRX) parameter value to maximize overlap between a first DRX On duration of the first SIM and a second DRX On duration of the second SIM.

12. The UE of clause 11, wherein the first DRX On duration and the second DRX On duration are aligned and coextensive.

13. The UE of clause 11, wherein the first DRX On duration and the second DRX On duration are partially overlapped.

14. The UE of clause 11, wherein the processor is further configured to:
    determine to operate in a Dual SIM Dual Standby (DSDS) mode in which either one but not both of the first SIM and the second SIM are available for handling calls at a given time; and
    setting the DRX parameter value to minimize overlap between the first DRX On duration and the second DRX On duration.

15. The UE of clause 14, wherein the first DRX On duration and the second DRX On duration have no overlap.

16. The UE of clause 14, wherein the first DRX On duration and the second DRX On duration are partially overlapped.

17. The UE of clause 11, wherein the processor is further configured to.
    select a wake-up signal offset parameter value based at least in part on the DSDA mode.

18. The UE of clause 11, wherein processor is configured to:
  transmit a UE Assistance Information message to a cell associated with the first SIM, the UE Assistance Information message specifying either or both of DRX cycle duration and start offset.

19. The UE of clause 11, wherein the processor is configured to:
  evaluate selection criteria for a plurality of cells for the first SIM, wherein the selection criteria include the DRX parameter value; and
  select a first cell of the plurality of cells based at least in part on the first cell complying with the DRX parameter value.

20. The UE of clause 11, wherein the processor is configured to:
  evaluate, for the first SIM, a plurality of bandwidth parts for conformance with the DRX parameter value; and
  select a first one of the bandwidth parts based at least in part on evaluating the plurality of bandwidth parts.

21. A non-transitory computer-readable medium having program code recorded thereon for wireless communication by a user equipment (UE), the program code comprising:
  code for operating in a Dual SIM Dual Standby (DSDS) mode in which either one but not both of a first subscriber identity module (SIM) and a second SIM are available for a connected mode at a given time; and
  code for setting a discontinuous reception (DRX) parameter value to minimize overlap between a first DRX On duration and a second DRX On duration in response to operating in the DSDS mode.

22. The non-transitory computer-readable medium of clause 21, further comprising:
  code for operating in a Dual SIM Dual Active (DSDA) mode in which both the first SIM and the second SIM are available for handling calls simultaneously; and
  code for setting the DRX parameter value to maximize overlap between the first DRX On duration and the second DRX On duration.

23. The non-transitory computer-readable medium of clause 21, further comprising:
  code for transmitting a UE Assistance Information message to a cell associated with the first SIM, the UE Assistance Information message specifying either or both of DRX cycle duration and start offset.

24. The non-transitory computer-readable medium of clause 21, further comprising.
  code for evaluating selection criteria for a plurality of cells for the first SIM, wherein the selection criteria include the DRX parameter value; and
  code for selecting a first cell of the plurality of cells based at least in part on the first cell complying with the DRX parameter value.

25. The non-transitory computer-readable medium of clause 21, further comprising:
  code for evaluating, for the first SIM, a plurality of bandwidth parts for conformance with the DRX parameter value; and
  code for selecting a first one of the bandwidth parts based at least in part on evaluating the plurality of bandwidth parts.

26. A user equipment (UE) comprising:
  a first subscriber identity module (SIM) and a second SIM;
  means for selecting a Dual SIM Dual Active (DSDA) mode or a Dual SIM Dual Standby (DSDS) mode based at least in part on available radio frequency (RF) resources for a frequency band combination available to the first SIM and the second SIM; and
  means for setting a discontinuous reception (DRX) On duration overlap for the first SIM and the second SIM based at least in part on the DSDA mode or the DSDS mode.

27. The UE of clause 26, wherein the setting means further comprises:
  means for selecting a wake-up signal offset parameter value based at least in part on the DSDA mode or the DSDS mode.

28. The UE of clause 26, wherein the setting means comprises:
  means for maximizing the DRX On duration overlap in response to operating in the DSDA mode.

29. The UE of clause 26, wherein the setting means comprises:
  means for minimizing the DRX On duration overlap in response to operating in the DSDS mode.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:
1. A method of wireless communication performed by a user equipment (UE), the method comprising:

determining to operate in a Dual SIM Dual Active (DSDA) mode or a Dual SIM Dual Standby (DSDS) mode, the UE having a first subscriber identity module (SIM) and a second SIM; and selecting a discontinuous reception (DRX) parameter value based at least in part on the DSDA mode or the DSDS mode, wherein the selecting the DRX parameter value comprises:

transmitting a UE Assistance Information message to a cell associated with the first SIM, the UE Assistance Information message specifying either or both of a DRX cycle duration and a start offset.

2. The method of claim 1, wherein the determining to operate in the DSDA mode or the DSDS mode comprises:

selecting the DSDA mode in response to the first SIM being associated with a first frequency range and the second SIM being associated with a second frequency range.

3. The method of claim 2, wherein the first frequency range comprises frequency range 1 (FR1), and wherein the second frequency range comprises frequency range 2 (FR2).

4. The method of claim 1, wherein the selecting the DRX parameter value comprises:

transmitting an additional UE Assistance Information message to a cell associated with the second SIM, the UE Assistance Information message specifying either or both of a DRX cycle duration and a start offset.

5. The method of claim 1, further comprising:

selecting a wake-up signal offset parameter value based at least in part on the DSDA mode or the DSDS mode.

6. A method of wireless communication performed by a user equipment (UE), the method comprising:

determining to operate in a Dual SIM Dual Active (DSDA) mode or a Dual SIM Dual Standby (DSDS) mode, the UE having a first subscriber identity module (SIM) and a second SIM;

selecting a discontinuous reception (DRX) parameter value based at least in part on the DSDA mode or the DSDS mode, wherein the selecting the DRX parameter value comprises:

evaluating selection criteria for a plurality of cells for the first SIM, wherein the selection criteria includes the DRX parameter value; and selecting a first cell of the plurality of cells based at least in part on the first cell complying with the DRX parameter value.

7. The method of claim 6, wherein the selecting the DRX parameter value comprises:

evaluating the selection criteria for an additional plurality of cells for the second SIM; and selecting a second cell of the additional plurality of cells based at least in part on the second cell complying with the DRX parameter value.

8. A method of wireless communication performed by a user equipment (UE), the method comprising:

determining to operate in a Dual SIM Dual Active (DSDA) mode or a Dual SIM Dual Standby (DSDS) mode, the UE having a first subscriber identity module (SIM) and a second SIM;

selecting a discontinuous reception (DRX) parameter value based at least in part on the DSDA mode or the DSDS mode, wherein the selecting the DRX parameter value comprises:

evaluating, for the first SIM, a plurality of bandwidth parts for conformance with the DRX parameter value; and selecting a first bandwidth part of the plurality of bandwidth parts based at least in part on the evaluating the plurality of bandwidth parts;

evaluating, for the second SIM, an additional plurality of bandwidth parts for conformance with the DRX parameter value; and selecting a second bandwidth part of the additional plurality of bandwidth parts based at least in part on evaluating the additional plurality of bandwidth parts.

9. A user equipment (UE) comprising:

a first subscriber identity module (SIM) associated with a first service provider subscription and a second SIM associated with a second service provider subscription; and a processor configured to access the first SIM and the second SIM, the processor further configured to:

determine to operate in a Dual SIM Dual Active (DSDA) mode or a Dual SIM Dual Standby (DSDS) mode;

select a discontinuous reception (DRX) parameter value based at least in part on the DSDA mode or the DSDS mode; and transmit a UE Assistance Information message to a cell associated with the first SIM, the UE Assistance Information message specifying either or both of a DRX cycle duration and a start offset.

10. The UE of claim 9, wherein the processor is configured to:

transmit an additional UE Assistance Information message to a cell associated with the second SIM, the UE Assistance Information message specifying either or both of a DRX cycle duration and a start offset.

11. A user equipment (UE) comprising:

a first subscriber identity module (SIM) associated with a first service provider subscription and a second SIM associated with a second service provider subscription; and a processor configured to access the first SIM and the second SIM, the processor further configured to:

determine to operate in a Dual SIM Dual Active (DSDA) mode or a Dual SIM Dual Standby (DSDS) mode;

select a discontinuous reception (DRX) parameter value based at least in part on the DSDA mode or the DSDS mode;

evaluate selection criteria for a plurality of cells for the first SIM, wherein the selection criteria includes the DRX parameter value; and select a first cell of the plurality of cells based at least in part on the first cell complying with the DRX parameter value.

12. The UE of claim 11, wherein the processor is configured to:

select the DSDA mode in response to the first SIM being associated with a first frequency range and the second SIM being associated with a second frequency range.

13. The UE of claim 12, wherein the first frequency range comprises frequency range 1 (FR1), and wherein the second frequency range comprises frequency range 2 (FR2).

14. The UE of claim 11, wherein the processor is configured to:

evaluate the selection criteria for an additional plurality of cells for the second SIM; and select a second cell of the additional plurality of cells based at least in part on the second cell complying with the DRX parameter value.

15. The UE of claim 11, wherein the processor is further configured to:
    select a wake-up signal offset parameter value based at least in part on the DSDA mode or the DSDS mode.

16. A user equipment (UE) comprising:
    a first subscriber identity module (SIM) associated with a first service provider subscription and a second SIM associated with a second service provider subscription; and
    a processor configured to access the first SIM and the second SIM, the processor further configured to:
        determine to operate in a Dual SIM Dual Active (DSDA) mode or a Dual SIM Dual Standby (DSDS) mode;
        select a discontinuous reception (DRX) parameter value based at least in part on the DSDA mode or the DSDS mode;
        evaluate, for the first SIM, a plurality of bandwidth parts for conformance with the DRX parameter value; and
        select a first bandwidth part of the plurality of bandwidth parts based at least in part on evaluating the plurality of bandwidth parts;
        evaluate, for the second SIM, an additional plurality of bandwidth parts for conformance with the DRX parameter value; and
        select a second bandwidth part of the additional plurality of bandwidth parts based at least in part on evaluating the additional plurality of bandwidth parts.

17. A non-transitory computer-readable medium having program code recorded thereon for wireless communication by a user equipment (UE), the program code comprising:
    code for determining to operate in a Dual SIM Dual Active (DSDA) mode or a Dual SIM Dual Standby (DSDS) mode, the UE having a first subscriber identity module (SIM) and a second SIM;
    code for selecting a discontinuous reception (DRX) parameter value based at least in part on the DSDA mode or the DSDS mode; and
    code for transmitting a UE Assistance Information message to a cell associated with the first SIM, the UE Assistance Information message specifying either or both of a DRX cycle duration and a start offset.

18. A non-transitory computer-readable medium having program code recorded thereon for wireless communication by a user equipment (UE), the program code comprising:
    code for determining to operate in a Dual SIM Dual Active (DSDA) mode or a Dual SIM Dual Standby (DSDS) mode, the UE having a first subscriber identity module (SIM) and a second SIM;
    code for selecting a discontinuous reception (DRX) parameter value based at least in part on the DSDA mode or the DSDS mode;
    code for evaluating selection criteria for a plurality of cells for the first SIM, wherein the selection criteria includes the DRX parameter value; and
    the code for selecting a first cell of the plurality of cells based at least in part on the first cell complying with the DRX parameter value.

19. A non-transitory computer-readable medium having program code recorded thereon for wireless communication by a user equipment (UE), the program code comprising:
    code for determining to operate in a Dual SIM Dual Active (DSDA) mode or a Dual SIM Dual Standby (DSDS) mode, the UE having a first subscriber identity module (SIM) and a second SIM;
    code for selecting a discontinuous reception (DRX) parameter value based at least in part on the DSDA mode or the DSDS mode;
    code for evaluating, for the first SIM, a plurality of bandwidth parts for conformance with the DRX parameter value; and
    code for selecting a first bandwidth part of the plurality of bandwidth parts based at least in part on the evaluating the plurality of bandwidth parts.

20. The non-transitory computer-readable medium of claim 19, further comprising:
    code for selecting a wake-up signal offset parameter value based at least in part on the DSDA mode or the DSDS mode.

21. The non-transitory computer-readable medium of claim 19, further comprising:
    code for selecting the DSDA mode in response to the first SIM being associated with a first frequency range and the second SIM being associated with a second frequency range, wherein the first frequency range comprises frequency range 1 (FR1) and the second frequency range comprises frequency range 2 (FR2).

* * * * *